United States Patent
Wilkerson et al.

[11] 3,917,435
[45] Nov. 4, 1975

[54] CAM AND NOZZLE CONTROL VALVE FOR FLUID FLOW MODULATION

[76] Inventors: Joseph B. Wilkerson, 24604 Marlboro Drive, Damascus, Md. 20750; Kenneth R. Reader, Box 73A, Monrovia, Md. 21770

[22] Filed: Jan. 11, 1974

[21] Appl. No.: 432,726

[52] U.S. Cl. .................................................. 416/20
[51] Int. Cl.² ................. B64C 15/08; B64C 27/18
[58] Field of Search ............................... 416/20, 90

[56] References Cited
UNITED STATES PATENTS

| | | | |
|---|---|---|---|
| 1,982,968 | 12/1934 | Stalker | 416/20 |
| 2,686,567 | 8/1954 | Costa | 416/20 |
| 3,039,537 | 6/1962 | Heidelberg | 416/20 |
| 3,211,397 | 10/1965 | Laing et al. | 416/20 |
| 3,525,576 | 8/1970 | Dorand | 416/20 |
| 3,525,577 | 8/1970 | Cheeseman | 416/20 |
| 3,713,750 | 1/1973 | Williams | 416/20 |
| 3,816,019 | 6/1974 | Norman et al. | 416/20 |
| 3,853,424 | 12/1974 | Bernaerts | 416/20 |

FOREIGN PATENTS OR APPLICATIONS

| | | | |
|---|---|---|---|
| 907,625 | 3/1954 | Germany | 416/20 |
| 634,332 | 3/1950 | United Kingdom | 416/20 |

*Primary Examiner*—Everette A. Powell, Jr.
*Attorney, Agent, or Firm*—R. S. Sciascia; Q. E. Hodges; O. M. Wildensteiner

[57] ABSTRACT

A hub valve for a CCR helicopter comprising a nonrotating central cam and a movable nozzle at the inlet to each blade. The cam determines the azimuthal position and relative magnitude of the cyclic lift and the nozzles, which move radially inward and outward, determine the magnitude of the collective lift. In a second embodiment, the nozzles are cycled radially in sequence to provide cyclic lift control at a fundamental frequency as well as at harmonics of this frequency.

10 Claims, 3 Drawing Figures

U.S. Patent  Nov. 4, 1975  3,917,435

CAM AND NOZZLE CONTROL VALVE FOR FLUID FLOW MODULATION

The invention described herein may be manufactured and used by or for the Government of the United States of America for governmental purposes without the payment of any royalties theron or therefor.

BACKGROUND OF THE INVENTION

The present invention relates to circulation control rotor (CCR) helicopters. As is well known, a CCR helicopter is one wherein the blades are rather rigidly attached to the rotor hub. Instead of the usual mechanical hinges, etc., which are used for collective and cyclic lift control in the conventional helicopter, a CCR helicopter achieves control over cyclic and collective lift by varying the circulation of air around the blades. This is done by tangentially blowing air through slots on the surface of the blade (see U.S. Pat. No. 3,713,750); in this manner the coefficient of lift of the blade, and hence its lift, can be varied without the use of complicated mechanical linkages. In the CCR blade, all moving parts associated with the hub and rotor assembly are in the valve which controls the flow of air to the blades.

The prior art shows examples of hub valves for controlling the flow of air in a CCR helicopter. Some of these valves include a nonrotating cam in the center of the hub which is used to get cyclic lift at the desired azimuthal position. In this type of arrangement, collective lift control is achieved by varying the pressure of air within the system. This type of collective lift control, however, has several disadvantages; one of these is that the degree of control over the amount of air that is being produced, and hence the amount of lift produced by the blades, may not be great enough to suit a particular application. Another disadvantage is that the response time of the air or other lift control fluid producing device may be excessively long, resulting in a long time lag between the time when the signal for additional collective lift is fed into the control system and the time when this additional collective lift is generated by the rotor. If the valve were designed to operate under a constant air flow supply pressure, additional collective lift could be supplied almost instantaneously.

Additionally, some other CCR valve mechanisms do not go directly from one combination of cyclic and collective airflow settings to another; the airflow settings pass through a series of intermediate settings which cause the craft to execute short term excursions from its desired path.

SUMMARY OF THE INVENTION

Briefly, the present invention comprises a hollow rotor hub with attached hollow blades. The entrance to each blade has a nozzle in it; each nozzle can be reciprocated in and out of the entrance to the blade. In the center of the hub is a nonrotating cam which can be offset any desired amount in any azimuthal direction. The gap between the periphery of the cam and the entrance to each blade air nozzle determines the amount of air that enters each blade and hence that blade's lift. The position of the nozzle at the entrance to each blade is controlled by a second cam; the contours of this cam can be such that all nozzles are operated in unison, or the cam can be designed to impose harmonics of the fundamental frequency on the air flow by moving the nozzles in pairs.

OBJECTS OF THE INVENTION

Accordingly, it is an object of the present invention to improve the degree of control over the amount of air entering a CCR blade.

It is a further object of the present invention to reduce the response time of the system supplying air or other lift control fluid to a CCR blade.

It is a further object of the present invention to provide a valve for a CCR helicopter which has linear or non-linear control characteristics, as desired.

Other objects and advantages of the present invention will be apparent from the following specification and accompanying drawings.

DESCRIPTION OF THE PREFERRED EMBODIMENT

Figures 1, 2, 3:
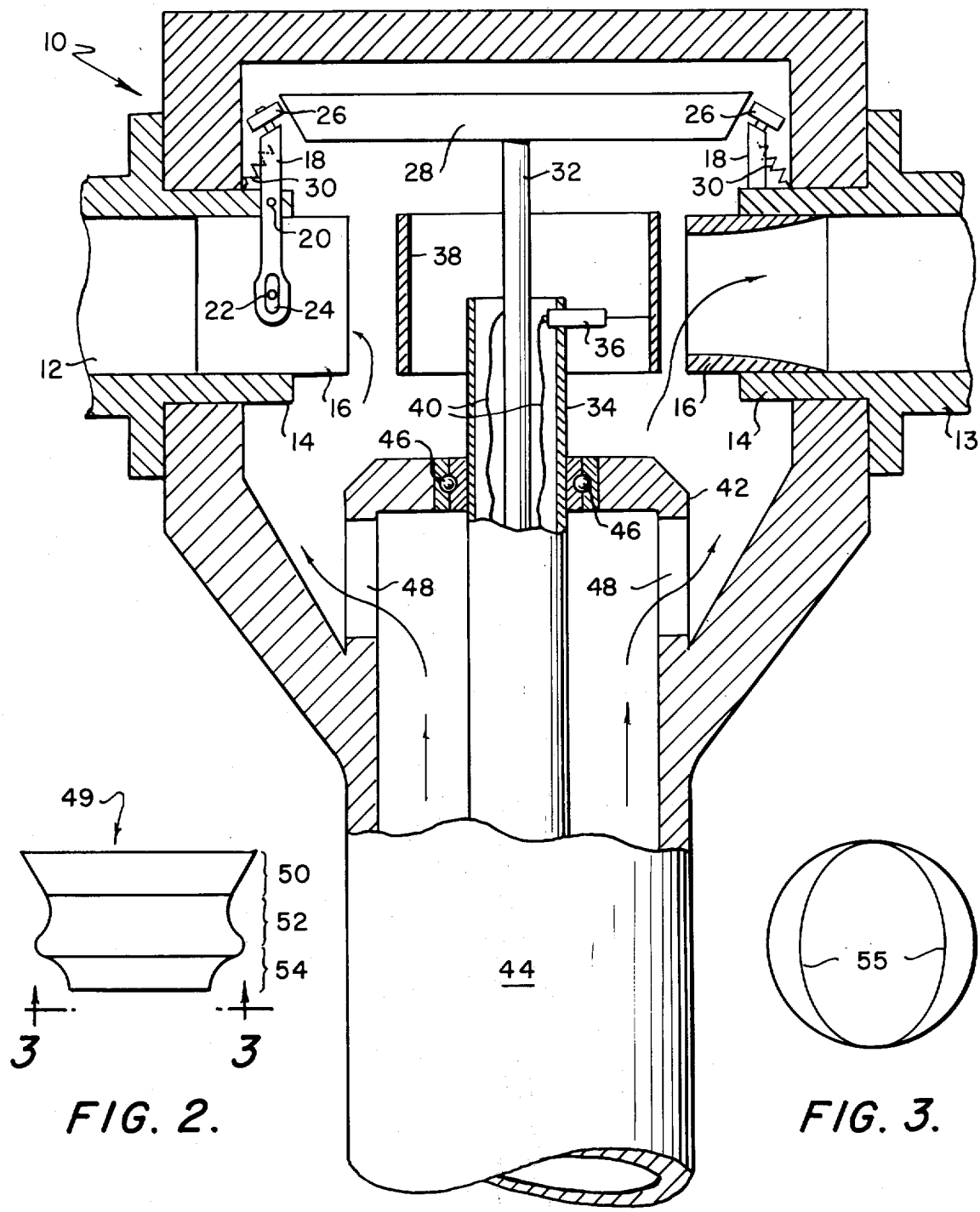
FIG. 1 is a cross-section view of the valve of the present invention.
FIG. 2 is a side view of an alternate cam plate configuration.
FIG. 3 is taken along line 3—3 of FIG. 2.

FIG. 1 shows a hub 10 which incorporates the valve of the present invention. Attached to hub 10 are blades 12 and 13, which may be attached by any convenient means such as bolting, welding, etc. Although FIG. 1 shows two blades attached to hub 10, it is to be understood that any number of blades can be used with the valve of the present invention. At the entrance to each blade is a nozzle adaptor 14, which guides nozzle 16 as it is reciprocated in and out. Nozzle 16 is reciprocated within nozzle adaptor 14 by means of link 18, which pivots about a fulcrum 20 that is attached to nozzle adaptor 14. One end of link 18 is attached to nozzle 16 by means of pin 22 within an elongated slot 24 in link 18. This arrangement allows nozzle 16 to be reciprocated in nozzle adaptor 14 as link 18 is rotated through an arc. The other end of link 18 has cam follower wheel 26 mounted on it. Link 18 is resiliently biased toward cam plate 28 by spring 30 which is attached to hub 10.

Cam plate 28, which is substantially nonrotating (as will be explained later), is rigidly attached to shaft 32 which is on the axis of hub 10. Shaft 32 is mounted for limited axial and rotary motion, as will be explained later.

Surrounding shaft 32 is casing 34; casing 34 undergoes no movement, and hence is mounted to the stationary part of the craft. Attached to shaft 34 are two (only one shown) hydraulic cylinders or other extensible members 36; these hydraulic cylinders 36 carry cam 38 on their outer ends. Hydraulic cylinders 36 are mounted at a right angle to each other and perpendicular to the centerline of shaft 34; in this manner cam 38 can be translated to any azimuthal position within hub 10. Hydraulic lines 40, which provide the means to operate hydraulic cylinders 36, are located within the annulus between shaft 32 and casing 34. Casing 34 is supported within extension 42 of main rotor shaft 44 by bearing 46. Holes 48 allow the passage of air into hub 10 as will be explained later.

FIGS. 2 and 3 show an alternate cam configuration 49 that can be used in place of cam plate 28. Surface 50 of cam 49 duplicates the surface of cam plate 28; as can be seen a cam surface of this type will give a linear control characteristic to nozzles 16. That is, equal increments of translation of the cam will produce equal motion of the nozzles. Cam surface 52, by contrast, has a non-linear surface; that is, the amount that nozzles 16 will move for each increment of translation of cam plate 49 will be a function of where cam follower wheels 26 are on the surface of cam 52. If cam follower wheels 26 were to traverse the full width of cam surface 52, nozzles 16 would be reciprocated radially outward and then inward again; at the mid point between the two extremes, nozzles 16 would not be moved at all even though cam 49 were being moved. Thus it will be seen that any type of nonlinearity of motion of nozzles 16 can be built into cam plate 49 merely by properly contouring a section of the cam plate. Cam surfaces 50 and 52 are circular as can be seen in FIG. 3; thus when cam follower wheels 26 are on either of these two surfaces, all nozzles will move in unison.

Cam surface 54 is approximately oval, as can be seen from FIG. 3. It will be obvious that when cam follower wheels 26 are on this surface, each nozzle will be reciprocated in and out twice in going around the circumference of cam surface 54.

Operation of the valve is as follows: Cam 38 is brought to the center of hub 10 by means of hydraulic cylinders 36. Cam plate 28 is translated axially downward, which causes nozzles 16 to be brought to their radially most inward position; at this point there will be the minimum gap between nozzles 16 and cam 38, which means that the minimum amount of air will flow into blades 12 and 13, causing them to generate the minimum amount of lift. Main shaft 44 is caused to rotate by means not shown. Air or other lift control fluid comes up within main shaft 44, into hub 10 through holes 48, and then into nozzles 16 as shown by the arrows. When it is desired to generate more collective lift, cam plate 28 is translated axially upward; as it does so, cam follower wheels 26 move radially inward thereby causing link 18 to force nozzles 16 radially outward. This increases the gap between nozzles 16 and cam 38, thereby allowing more air to flow into nozzles 16 and generate more lift.

Horizontal flight of the craft requires the generation of unequal lift by the rotor, which is created by unbalanced airflow within the rotor; this is accomplished by translating cam 38 diametrically away from the azimuthal point at which the unbalanced air flow is desired. In FIG. 1, cam 38 has been translated toward blade 13; as can be seen, a greater amount of air enters blade 12 than blade 13 and hence blade 12 will generate more lift than blade 13. As stated earlier, hydraulic cylinders 36 allow cam 38 to be translated to any azimuthal position within hub 10; thus the unbalanced airflow can be generated at any azimuthal position. If cam plate 28 is now moved axially in either direction, all of nozzles 16 would be moved by a corresponding equal amount; the azimuthal position of the unbalanced airflow will not be changed, only the collective lift developed by the rotor will be changed. Thus the cyclic control of the rotor will be seen to be independent of the collective control of the rotor.

At times during operation of the craft in flight, it becomes desirable to generate cyclic lift at more than one point on the rotor disc. This is done by using a multilobed cam such as cam 54. As stated earlier, when cam follower wheels 26 are on cam 54 nozzles 16 will be cycled twice for each revolution of hub 10. Every time that a given wheel 26 is on one of the low sides of cam 54 the nozzle associated with that wheel will be moved radially outward, allowing additional lift control air into that blade. Since cam 54 has two lobes and two low sides, cyclic lift will be generated at two points on the disc; if cam 54 had three lobes and three low sides, lift would be generated at three points. Alternate cam plate 49 is rotated (by rotating shaft 32) until low sides 55 of cam 54 are facing the points at which the cyclic lift is desired. Pulses of air are then fed to the rotor blades whose cam followers are on surfaces 55 of cam 54. These pulses occur twice per revolution for each blade; they are used to cancel out rotor vibrations and to spread lift out over more of the rotor disc. Horizontal flight is achieved as before; i.e., by offsetting cam 38 away from the point at which the unbalanced rotor force is desired.

Cam 54 may have more than just one cyclic variation on it. For example, it may be found that a low amplitude cyclic variation of 5 times per revolution, superimposed on the two lobe cam of FIG. 3, will reduce the rotor vibrations. Cam 54 would then have a sinusoidal surface, with 5 complete sine waves on it, which follows the present two lobe contour. The final design of a cam surface having a plurality of superimposed cyclic variations on it will have to be determined by experiment, however, since the amplitude as well as the number of cycles can be varied.

Another method of imposing pulsations on the airflow is to axially reciprocate cam 28 or 49 at the desired frequency. However, this imposes stresses on the assembly as a whole that do not occur with the contoured cam; furthermore, it is mechanically more complex. Hence, it may be somewhat less desirable.

Thus it will be seen that the present hub valve allows much more precise control over the airflow to each blade. Cam plate 28 (or alternate cam plate 49), which controls collective lift, is totally independent of cam 38, which controls cyclic lift. Any combinations of cyclic and collective lift can be generated by the rotor, hence the rotor's performance can be optimized at all flight conditions.

Obviously many modifications and variations of the present invention are possible in the light of the above teachings. It is therefore to be understood that within the scope of the appended claims the invention may be practiced otherwise than as specifically described.

What is claimed is:

1. A rotor hub for a circulation control helicopter rotor comprising:
    a non-rotating member;
    means to horizontally translate said non-rotating member;
    a rotating blade-carrying member surrounding said non-rotating member and spaced therefrom to form a fluid flow passage therebetween; and
    movable fluid flow nozzles in said rotating blade-carrying member adjacent the nonrotating member.

2. A rotor hub as in claim 1 including means to move said fluid flow nozzles toward and away from said non-rotating member.

3. A rotor hub as in claim 2 having one fluid flow nozzle per blade.

4. A rotor hub as in claim 3 including a cam on said non-rotating member and a follower assembly for moving said fluid flow nozzles.

5. A rotor hub as in claim 4 wherein said cam includes a plurality of surfaces which cause both linear and non-linear motion of said nozzles.

6. A rotor hub as in claim 5 wherein said cam includes surfaces whose similarly contoured portions are equally spaced around said cam.

7. A rotor hub as in claim 5 wherein said cam includes a surface which has a plurality of contours superimposed on one another.

8. A rotor hub as in claim 7 wherein said contours are of different cyclic periods.

9. A rotor hub as in claim 7 wherein said contours are of different amplitudes.

10. A rotor hub as in claim 6 including means to move said cam along its axis.

* * * * *